United States Patent Office 3,326,440
Patented June 20, 1967

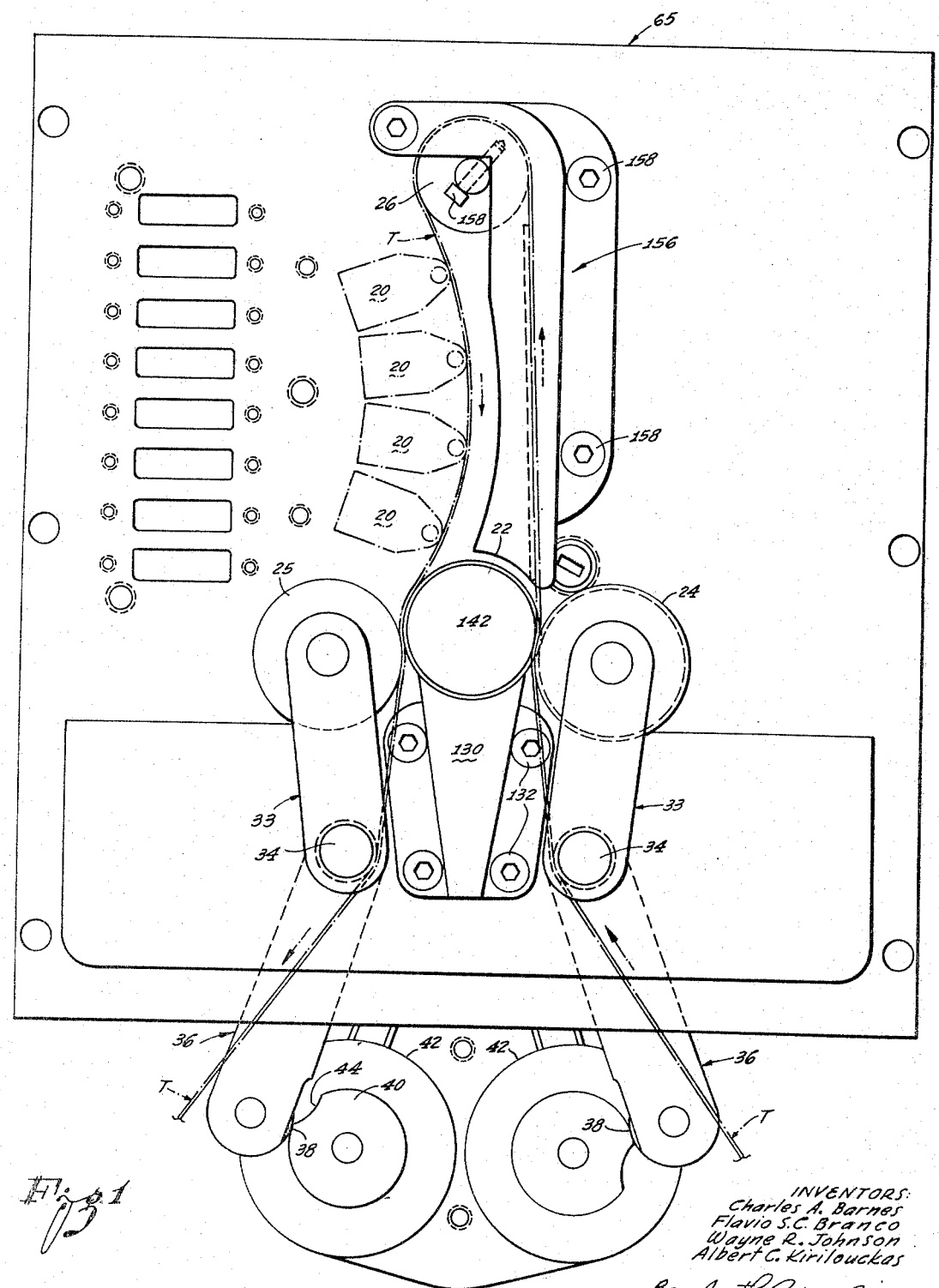

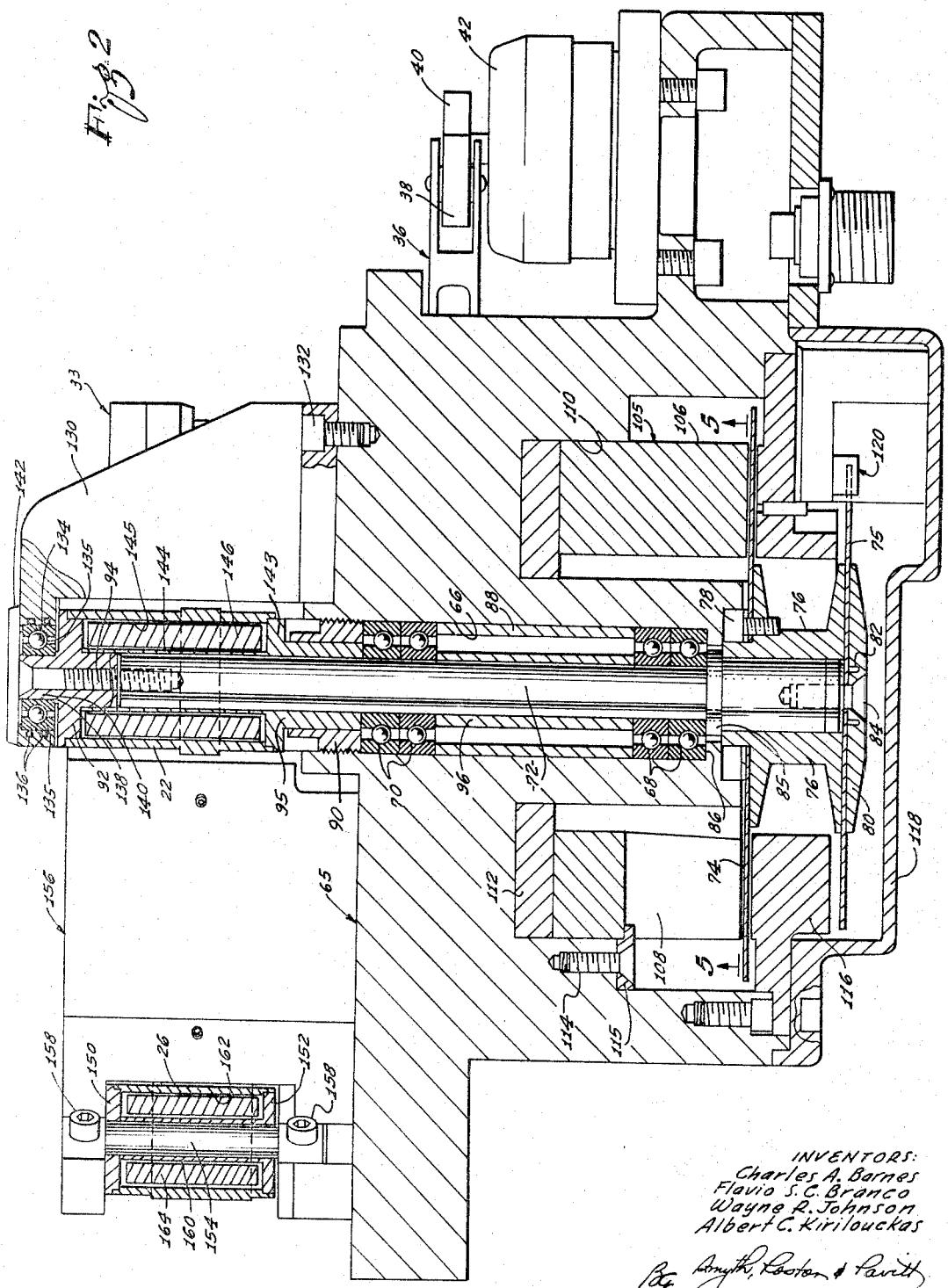

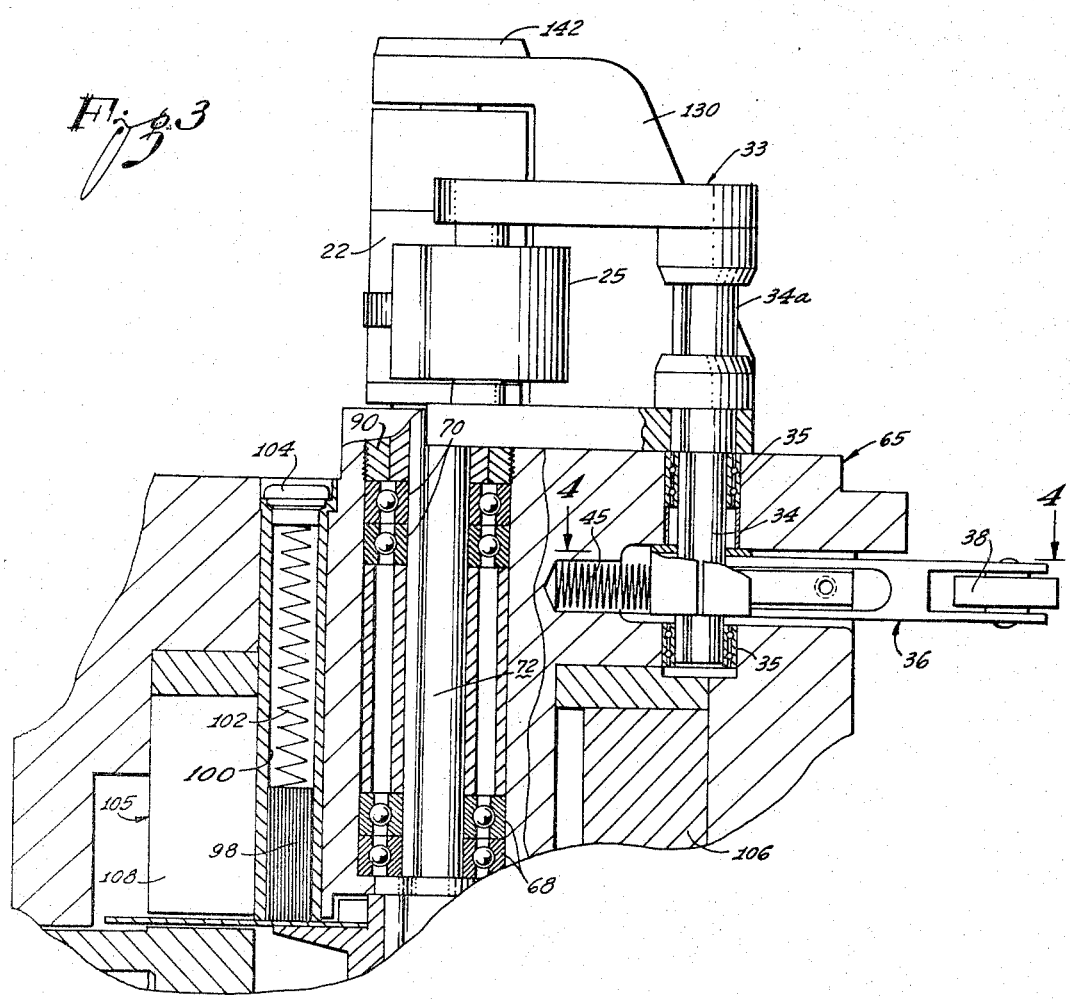

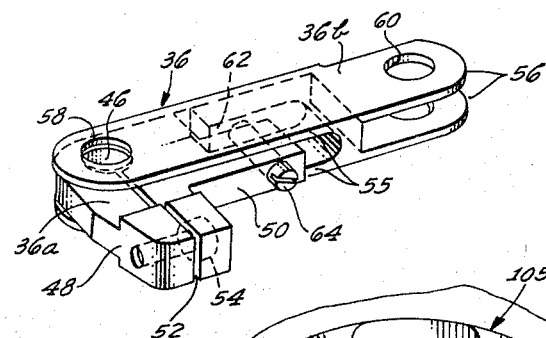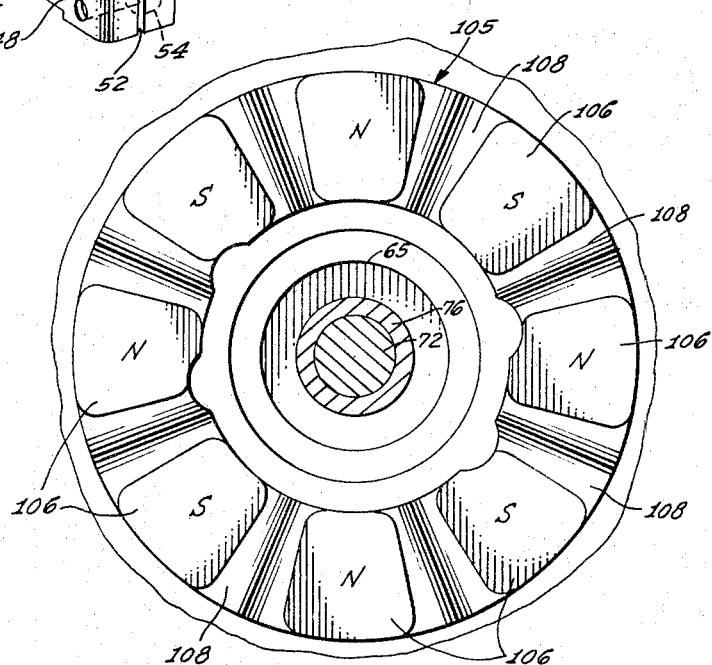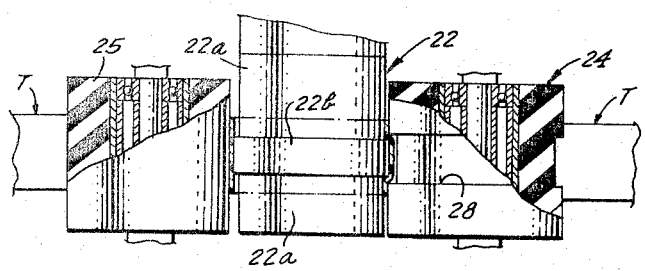

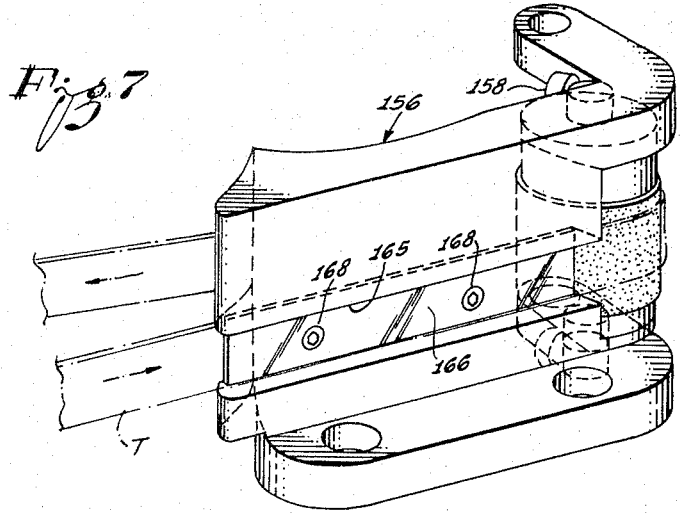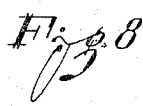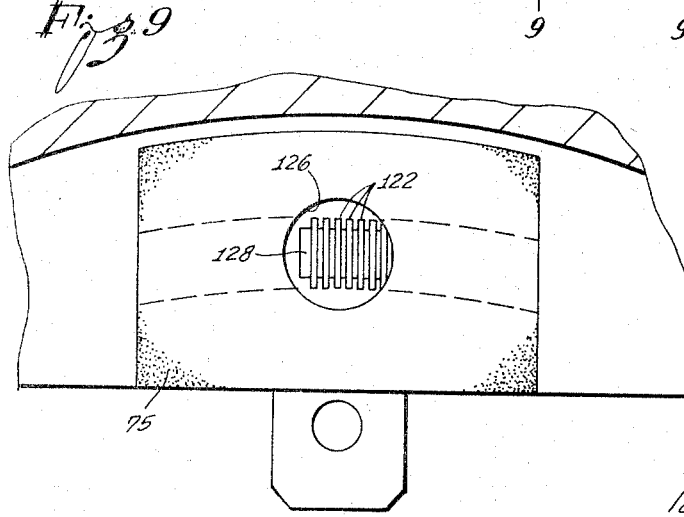

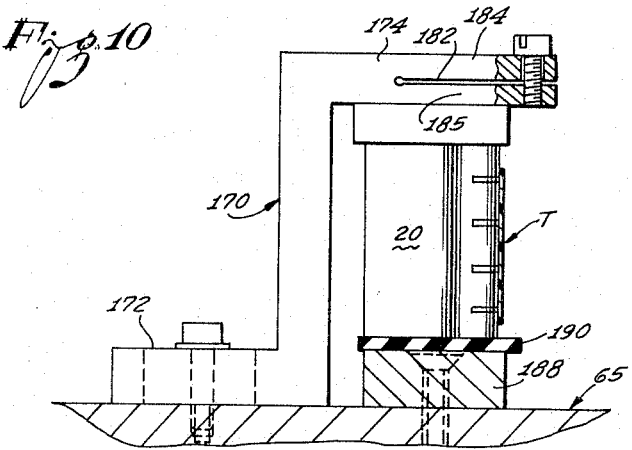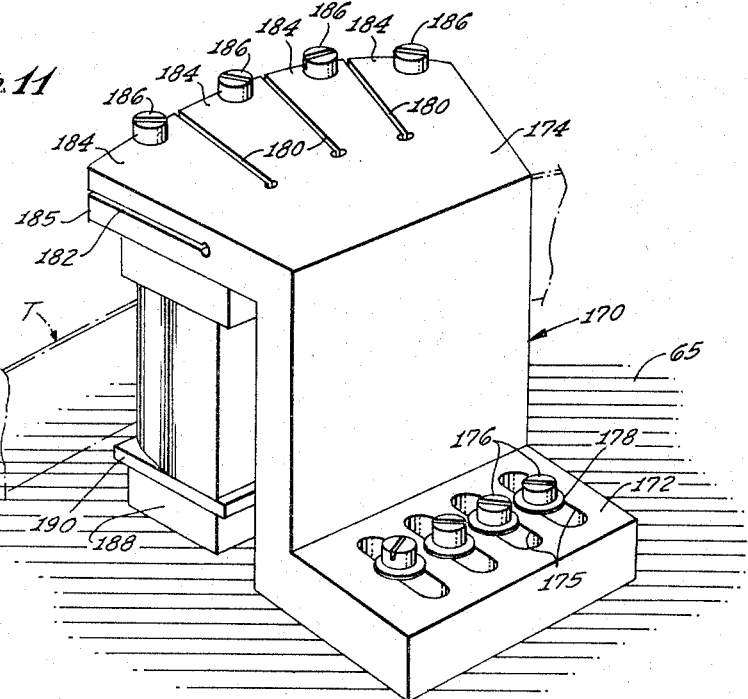

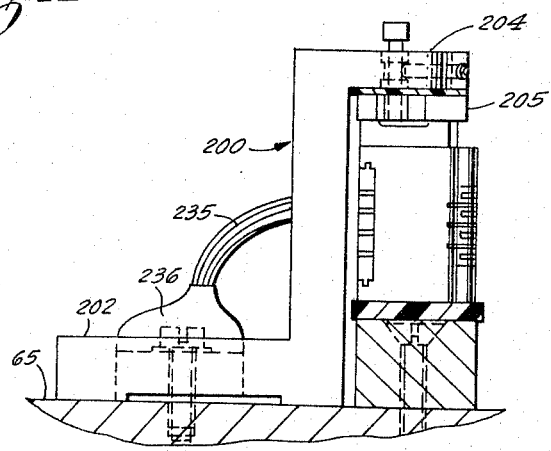
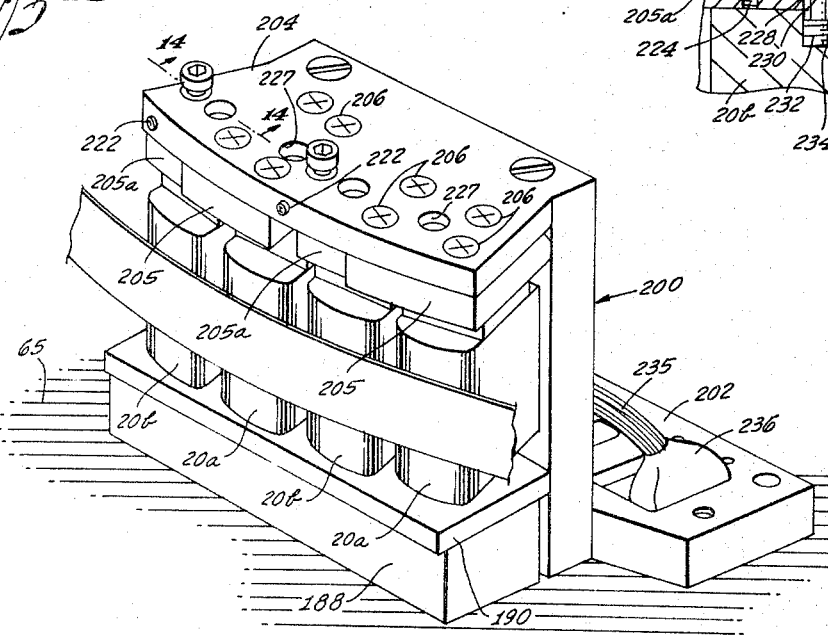

3,326,440
HIGH PRECISION TAPE-TRANSPORT MECHANISM
Charles A. Barnes, Mission Hills, Flavio S. C. Branco, Van Nuys, Wayne R. Johnson, Los Angeles, and Albert C. Kirilouckas, Granada Hills, Calif., assignors to Minnesota Mining and Manufacturing Company, St. Paul, Minn., a corporation of Delaware
Filed Jan. 9, 1963, Ser. No. 250,273
24 Claims. (Cl. 226—188)

This invention relates to a tape-transport mechanism for driving a tape under tension past a transducer station for recording and reproducing signals and is directed specifically to the problem of driving the tape at an accurately controlled constant speed for recording and reproducing signals with a high degree of precision.

For many purposes, for example for the purpose of simply recording and reproducing speech with acceptable clarity, no high degree of accuracy is necessary in controlling the rate of travel of the tape. For recording high fidelity music somewhat closer control is required but such control is not difficult to achieve. Complications arise, however, in seeking more precise control for high speed multiple channel recording, for example, for television recording. The difficulties are even more complex when the limits of accuracy are pushed even higher to approach absolute precision in recording and reproducing exceedingly precise data.

The initial embodiment of the present invention is directed to the problem of moving a tape selectively at speeds of 7½ inches, 15 inches, 30 inches, 60 inches, 120 inches and 180 inches per second with the tape neither leading nor lagging by more than 7½ micro-inches in comparison with an ideal absolutely constant rate of travel. The fact that this maximum range of error of 15 micro-inches is exceedingly small, may be appreciated when it is considered that the total range equals the wave length of green light. The problem of achieving this exceedingly high degree of accuracy may best be explained by first examining the actual mechanism employed in the initial embodiment of the invention.

In the drawings, which are to be regarded as merely illustrative:

FIG. 1 is a plan view of a tape-transport mechanism embodying a selected practice of the invention;

FIG. 2 is a sectional view showing the capstan drive assembly together with associated mechanism including an idler roller;

FIG. 3 is a fragmentary view partly in section and partly in side elevation showing the releasable nip roller mechanism;

FIG. 4 is a perspective view of a bell crank that is incorporated in the releasable nip roller mechanism;

FIG. 5 is a face view of a ring magnet of the motor that drives the capstan;

FIG. 6 is a view partly in side elevation and partly in section showing the capstan and the associated pair of nip rollers;

FIG. 7 is a perspective view of a tape guide that is associated with the tensioned loop of tape;

FIG. 8 is an elevational view of a sensing means that cooperates with a tachometer disk to detect the speed of rotation of the capstan;

FIG. 9 is an enlarged plan view as seen along the line 9—9 of FIG. 8 showing how the tachometer disk is constructed to create pulses of light for detection by a photoelectric cell;

FIG. 10 is an elevational view partly in section showing how transducer heads are mounted at a transducer station;

FIG. 11 is a perspective view of the structure shown in FIG. 10;

FIG. 12 is a view partly in end elevation and partly in section of an alternate structure for mounting the four transducer heads;

FIG. 13 is a perspective view of the same structure; and

FIG. 14 is a fragmentary sectional view somewhat enlarged taken as indicated by the line 14—14 of FIG. 13.

*Means for forming a tensioned loop in the traveling tape*

FIG. 1 shows how a traveling magnetic tape, designated T, is unwound from a pay-out reel (not shown) and is formed into a tensioned loop in a well-known manner with one side of the loop adjacent a transducing station or zone where four transducer heads 20 contact the tape for recording and reproducing signals. The tensioned loop is formed by a power-driven capstan 22 with the assistance of a pair of pucks or nip rollers 24 and 25 and with the cooperation of an idler roller 26.

The ignoring tape passes between the capstan 22 and the ingoing nip roller 24 which cooperate to drive the tape at a given constant rate. After passing around the idler roller 26, the loop of tape is engaged by the capstan and the outgoing nip roller 25 which cooperate to drive the tape at a slightly faster rate and thereby create and maintain tension in the tape loop. From the outgoing nip roller 25 the tape passes to the usual take-up reel (not shown).

Any one of various known arrangements may be used for causing the capstan and the two nip rollers to drive the tape in the desired differential manner. In this particular embodiment of the invention the capstan and the nip rollers cooperate in the manner indicated in FIG. 6.

In FIG. 6 the capstan 22 is in the form of a cylinder with a relatively rough surface for effective frictional engagement with the tape and for this purpose the metal surface of the capstan may be coated with tungsten by a flame-spraying process. The peripheral surface of the capstan is divided into three sections, namely, two opposite end sections 22a of the same diameter and a midsection 22b of slightly increased diameter.

The ingoing nip roller 24 has a thick cylindrical wall of suitable elastomeric material which is formed with a circumferential groove 28 which is wide enough and deep enough to provide ample clearance with respect to the mid-section 22b of the capstan 22. Thus the ingoing nip roller straddles the enlarged mid-section 22b of the capstan, the two opposite end portions of the nip roller registering with the end sections 22a of the capstan. The outgoing nip roller 25 which also has a thick cylindrical wall of suitable elastomeric material, is of uniform diameter and thus cooperates with only the enlarged midsection 22b of the capstan.

It is apparent in FIG. 6 that since the ingoing nip roller 24 presses the tape T against only the two sections 22a of the capstan, the ingoing nip roller cooperates with the capstan to drive the tape at the peripheral speed of the two end sections 22a of the capstan. On the other hand, since the outgoing nip roller 25 presses the tape against only the enlarged mid-section 22b of the capstan, the outgoing roller causes the tape to travel at the greater peripheral speed of the mid-section 22b. It is the difference between these two peripheral speeds caused by the different diameters of the capstan that causes the tape to be maintained under tension.

Since the speed of travel of the tape past the transducing station must be regulated with high precision, a closed-loop servomechanism is necessary. When the signals are being recorded on the tape, the closed-loop servomechanism includes means such as a tachometer for sensing the speed of the tape, means for comparing the measured speed with the desired speed to arrive at errors and means for making corresponding corrections in the speed of the traveling tape. When signals are recorded on the tape, timing signals are also recorded on the tape. For the purpose of speed control when the tape is rerun to reproduce the recorded signals, the servomechanism includes a transducer head to sensing the timing signals on the tape together with means to compare the frequency of the timing signals with the desired frequency and additional provision for making corresponding corrections in the speed of the tape.

The overall problem

Inevitably, random disturbances and vibratory forces arise in the tape-transport mechanism that tend to vary the speed of the tape beyond the required exceedingly small tolerance. The possible disturbances are too numerous to list but some of the more troublesome may be mentioned.

The tape itself serves as a medium for travel to the transducing station of disturbances originating both in the pay-out reel and in the take-up reel. In addition, tape flutter tends to be created for various reasons within the tensioned loop of the tape. For example, exceedingly small degrees of eccentricity of either the drive capstan or the idler roller will create disturbing vibratory forces.

The drive capstan must be connected to some kind of a prime mover such as an electric motor and, of course, receives various disturbances originating in the prime mover. The drive capstan must be mounted on a drive shaft journalled in suitable bearings and the capstan receives vibratory forces created by the bearings. It has been found, for example, that in the absence of effective counter measures, a minute scratch on a single ball in an anti-friction bearing for the capstan shaft creates vibration of sufficient force and amplitude to defeat the desired constant speed of the tape. If the drive shaft on which the capstan is mounted is a cantilever shaft, i.e., a shaft with bearings on only one end, the shaft itself may flex in a vibratory manner.

Any tachometer used for the servo-loop in the recording operation must be connected with the drive capstan and consequently may generate disturbances that are directly communicated to the capstan. The idler roller at the outer end of the tensioned loop must be journalled in some anti-friction bearing arrangement which inevitably creates additional disturbances in close proximity to the transducer station.

It is also to be noted that since the traveling tape has appreciable compliance or longitudinal resiliency, it acts like a single tensioned spring on one side of the loop between the drive capstan and the idler stage and on the other side of the loop acts like a series of springs between the successive transducer heads as well as between one transducing head and the drive capstan and between another transducing head and the idler roller. Such a spring arrangement both transmits and modifies the created disturbances.

The problem, then, is to transport the tape at a constant speed within exceedingly narrow limits of error in the face of these diverse disturbances, all of which have effects of exceedingly large magnitude in comparison with the permitted narrow limits of error.

The broad solution to the problem

The solution to the problem is found in a combination of various provisions which work together to narrow the departures from a constant rate of tape travel to keep the departures within the required exceedingly narrow margin.

One provision is to minimize the generation of disturbances at their various sources. Exceedingly fine accuracy is sought in fabricating and assembling the parts of the tape-transport mechanism and great care is taken to achieve close concentricity and dynamic balance of all rotating parts.

Another provision is to dampen the unavoidable disturbances as effectively as possible. For this purpose internal damping is incorporated both in the drive capstan and in the cooperating idler roller and additional external damping is provided at the drive capstan. Further provision is made to confine the tape in a stable manner on one side of the tensioned loop, the traveling tape being confined to a desired path by fixed guide means. The transducer station is on the other side of the tensioned loop and each of the transducer heads in this zone is provided with external damping. All of these provisions of internal and external damping together with the tape-confining guide on one side of the tensioned loop combine to make the transducer station a relatively quiescent or "dead" zone.

At first thought, it would seem that the overall problem could be solved by simply using these damping provisions to reduce the disturbing effects to the correction capability of the servo-loop. In practice, however, complications and limiting factors are encountered which make this approach exceedingly difficult.

In the first place, it is a problem to provide a servomechanism that is sufficiently responsive to make the rapid minute corrections that are required to keep the tape from leading or lagging with respect to the desired speed by more than 7½ micro-inches. This problem is complicated because the motor for the drive capstan is included in the servo-loop and a conventional motor has many times too much inertia for the required rapidity of response to correction signals. The invention meets this problem by providing a servomechanism that is amply responsive, which is to say, has an adequate bandwidth of frequency of response. The range of response in the present practice of the invention extends from zero to 4000 c.p.s.

With these three provisions, namely the minimizing of the disturbances at their sources, the damping of the unavoidable disturbances, and the employment of a sensitive servo-system, the desired extremely close speed regulation is still out of reach. It is found that the servomechanism is too limited and at times too unstable for such fine response. Upon careful investigation to ascertain the underlying reasons, it has been found that resonance frequencies exist in the tape-transport mechanism that fall within the response spectrum of the servomechanism. Too often, a disturbance originating in the tape-transport mechanism coincides with one of these resonance frequencies to result in an amplification of the disturbance force to such extent as to override the servomechanism.

With this discovery of the final difficulty, the final solution to the overall problem is achieved by the further step of so designing the whole transport mechanism as to raise all inherent resonance frequencies above the peak response frequency of 4000 c.p.s. of the servomechanism.

The releasable nip roller mechanism (FIGS. 1–4)

Each of the two nip rollers 24 and 25 is mounted by bearings between the two arms of a yoke 33 that is fixedly mounted on a corresponding rocker shaft 34, the rocker shaft being journalled in suitable bearings 35. Each rocker shaft 34 fixedly carries a spool-shaped member 34a which serves as a guide for the traveling tape. Fixedly mounted on the same rocker shaft is a lower bell crank, generally designated 36, which carries a follower in the form of a roller 38 for cooperation with a corresponding rotary cam 40. The rotary cam 40 is mounted on a suitable rotary solenoid 42 for oscillation thereby, the cam being of circular configuration with an arcuate peripheral recess 44 for actuation of the follower. When the two rotary solenoids 42 are de-energized, the rotary cams 40 are positioned to receive the corresponding rollers 38 in the cam recesses 44 and suitable coil spring 45 (FIG. 3) act on short arms of the two bell cranks 36 to swing the yokes 33 for retracting the two nip rollers away from the capstan to provide clearance between the nip rollers and the capstan to permit installing or removing a tape. When the two rotary solenoids 42 are energized the rotary cams 40 are rotated to the positions shown in FIG. 1 to return the two nip rollers 24 and 25 into pressure contact with the capstan.

It is contemplated that the two bell cranks 36 will be adjustable for varying the pressure of the nip rollers against the capstan. For this purpose each bell crank 36 is made in two separate sections 36a and 36b as shown in FIG. 4. The bell crank section 36a is formed with a bore 46 to receive the rocker shaft 34 and is of angular construction with two legs 48 and 50. The leg 48 is formed with a slot of kerf 52 that extends to the bore 46 and is provided with a screw 54 which extends across the kerf and may be tightened for closing action of the kerf to cause the bell crank section to firmly grip the rocker shaft 34.

The second bell crank section 36b is of forked construction at both of its ends, being formed with two arms 55 to straddle the first bell crank section 36a and being formed with two arms 56 at its other end to straddle the corresponding roller 38, the first pair of arms being bored as indicated at 58 to receive the rocker shaft 34 and the second pair of arms being bored as indicated at 60 for journalling the roller 38.

Each of the previously mentioned coil springs 45 exerts pressure against the corresponding bell crank leg 48 and thereby tends to rotate the bell crank section 36a against a shoulder 62 of the bell crank section 36b. The leg 50 of the bell crank section 36a is provided with a set screw 64, the leading end of which abuts the shoulder 62.

It is apparent that coarse adjustment of the bell crank 36 with respect to the pressure exerted by the corresponding nip roller against the capstan may be effected by temporarily loosening the screw 54 to adjust the angular position of the bell crank section 36a on the rocker shaft 34. Then finer adjustment may be accomplished by manipulation of the set screw 64.

The capstan drive

All of the working parts of the device including the capstan drive are carried by a heavy metal base block 65 to minimize undesirable relative movement among the working parts. Journalled in a large bore 66 in the base block by a first pair of ball bearings 68 and a second pair of ball bearings 70 is a unitary drive assembly comprising a drive shaft 72, a rotor or armature disk 74 of a drive motor and a tachometer disk 75. The armature disk 74 and the tachometer disk 75 are both mounted on the drive shaft 72 by means of a spool-shaped hub member 76, the armature disk being anchored against one flange of the hub member by suitable screws 78 and the tachometer disk 75 being secured against the other flange by a cap 80 with the tachometer disk held against rotation by small dowel pins 82. The cap 80 is secured by a screw 84 which when tightened causes the cap to clamp the hub member 76 against a radial flange 85 of the drive shaft.

The outer races of the first pair of ball bearings 68 bear against an inner circumferential shoulder 86 of the large bore 66 and abut an outer spacer sleeve 88 which in turn bears against the outer races of the second pair of ball bearings 70. The outer races of the ball bearings 70 abut a screw-threaded retainer bushing 90 which may be tightened in the large bore 66 for clamping action on the outer races of the four bearings.

The capstan 22 is in the form of a metal cylinder, the upper end of which is engaged by a cap 92 that is secured to the upper end of the drive shaft by a suitable screw 94. The lower end of the capstan cylinder is engaged by a bushing 95 on the drive shaft 72 which abuts the inner races of the ball bearings 70. The inner races of the ball bearings 70 abut an inner spacer sleeve 96 which abuts the inner races of the ball bearings 68, the inner races of the ball bearings 68, in turn, abutting the radial flange 85 of the drive shaft. It is apparent that tightening the screw 94 against the cap 92 creates axial pressure against the bushing 95 which is transmitted through the inner races of the ball bearings to the radial flange 85.

The drive motor is a printed circuit motor of a well-known type manufactured by Printed Motors, Inc., of New York city, but in this instance the motor is fabricated with exceptional accuracy. The armature disk 74 of the motor is a light thin plastic disk with suitable printed circuitry to permit the armature to act as a commutator in cooperation with four brushes 98. As shown in FIG. 3 each of the brushes 98 is mounted in a corresponding bore 100 in the base block 65, the brush being maintained under pressure by a coil spring 102 confined between the brush and a plug 104 at the outer end of the bore.

Associated with the armature disk 74 is a fixed ring magnet 105 which, as shown in FIG. 5, is formed with a series of alternate magnetic poles 106, the poles being separated by slots 108. The ring magnet 105 is mounted in an anular recess 110 of the base block 65 and is backed against a ring 112 of non-magnetic material which functions as a magnetic shield. The ring magnet is held in place by suitable screws 114 equipped with retainer collars 115.

The poles 106 of the ring magnet 105 are in close proximity of one face of the armature disk 74 and a ring-shaped return pole 116 is positioned closely adjacent to the second face of the armature disk. The return pole 116 and the corresponding end of the drive assembly are enclosed by a suitable removable cover plate 118.

The tachometer disk 75 which is a thin transparent plastic disk, extends at its outer margin into a sensing assembly that is generally designated by numeral 120. As shown in FIG. 9 the tachometer disk 75 is provided with a circumferential series of equally spaced opaque bars or heavy printed lines 122 whereby a beam of light directed through the rotating tachometer disk is converted into pulsations of light.

As shown in FIG. 8, the sensing assembly 120 includes a lamp bulb 124 which directs such a beam of light through a window 125 onto the tachometer disk in the region of the opaque bars. The light beam after being chopped by the opaque bars 122 passes through a second window 126 (FIG. 9) to fall on a photoelectric cell 128 for the creation of corresponding electrical pulses for the servomechanism. In a manner well known to the art the frequency of the electrical pulses is compared with a reference frequency and error signals created by the comparison regulate the speed of rotation of the drive motor. At the same time the electrical pulses created by the tachometer impress timing signals on the traveling tape and when the tape is rerun the servomechanism uses the timing signals from the tape for comparison with the reference frequency for regulation of the drive motor.

Means to minimize disturbances originating in the immediate vicinity of the tensioned tape loop The two spaced pairs of roller bearings 68 and 70 lend stability to the end of the shaft that carries the armature disk 74 and the tachometer disk 75 but an additional bearing is required to give stability to the opposite end of the shaft that carries the capstan 22. It is exceedingly difficult to mount three spaced bearings rigidly in high precision axial alignment and it is not practical to attempt to do so. This problem is met by floatingly mounting the third bearing.

In the construction shown, a bracket 130 in the form of a heavy block of metal is rigidly mounted on the base block 65 by a plurality of screws 132, the block overhanging the end of the drive shaft 72. The overhanging portion of the bracket block 130 is formed with a circular opening 134 in axial alignment with the large bore 66 in which the drive shaft is mounted. The outer race of a ball bearing 135 is mounted in the circular opening 134 of the bracket block by a pair of surrounding elastomeric O-rings 136 which seat in corresponding inner circumferential grooves in the bearing block. The inner race of the ball bearing 135 abuts an annular shoulder 138 of the previously mentioned cap 92 on the end of the drive shaft and embraces a hub 140 that is integral with the cap. The outer race of the ball bearing is retained in the circular opening 134 by a suitably secured circular cover plate 142.

The cylindrical capstan 22 is provided with suitable internal damping. For this purpose the cylindrical capstan is joined in a fluid-tight manner at its upper end to the cap 92 and it its lower end is joined in a fluid-tight manner to a flange 143 of the bushing 95 and the bushing 95 is formed with a thin walled sleeve 144 which extends along the drive shaft and is connected in a fluid-tight manner to the cap 92. Thus the capstan cylinder in combination with the cap 92 and the bushing 95 forms a concentric annular chamber 145. An annular metal damping body 146 of high specific gravity is mounted in the annular chamber 145 in a freely rotatable manner and for this purpose is immersed in a liquid which preferably is a silicone fluid of high viscosity to form a film for supporting the body.

The idler roller 26 is also provided with suitable internal damping. In the construction shown, the idler roller is in the form of a cylinder that is clamped between a pair of disks 150 and 152, the two disks being journalled on a fixed axle pin 154. The opposite ends of the axle pin 154 are secured by diametrical screws 155 to a tape guide 156 which in turn is secured to the base block 65 by suitable diametrical screws 158.

The idler roller cylinder 26 is joined to the two disks 150 and 152 in a fluid-tight manner and the disk 152 is formed with an integral thin-walled sleeve 160 which joins the disk 150 in a fluid-tight manner. Thus the idler roller cylinder, together with the two disks forms a concentric annular chamber 162. Here again an annular metal damping body 164 is mounted in the annular chamber 162 in a freely rotatable manner and for this purpose is imersed in silcone fluid of sufficiently high viscosity to form a film for supporting the body.

The tape guide 156 which is a metal body of the configuration shown in FIGS. 1 and 7 is formed with a smooth longitudinal channel 165 on one side which slidingly confines the ingoing leg of the tensioned loop of the tape T. This guide groove terminates tangentially of the peripheral surface of the idler roller 26 and preferably is lined with a highly polished plate 166 that is secured to the tape guide by suitable screws 168. The tape guide 156 is spaced away from the outgoing leg of the tensioned tape loop as may be seen in FIG. 1 to permit the four transducer heads 20 to deflect the tape T as shown, for the purpose of making intimate contact with the tape.

The four transducer heads 20 may be mounted on the base block 65 in the manner illustrated by FIGS. 10 and 11.

In FIGS. 10 and 11 a heavy metal bracket 170 has a base flange 172 which rests on the base block 65 and has a second opposite flange 174 which overhangs the four transducer heads 20. The base flange 172 is provided with parallel slots 175 to receive mounting screws 176 provided with washers 178, the slots being slightly oversized relative to the screws. This arrangement permits such adjustment of the bracket 170 as may be required for positioning the transducer heads in correct relation to the traveling tape.

The upper flange 174 of the bracket 170 has three kerfs 180 perpendicular to its plane and has an additional kerf 182 parallel to its opposite faces whereby the upper flange is formed into a series of four upper tongues 184 and a series of corresponding lower tongues 185. The four transducer heads 20 are fixedly mounted on the undersides of the four corresponding lower tongues 185. To permit adjustment of the four transducer heads into parallel relationship with the face of the adjacent tape T, the two tongues of each of the four pairs of tongues 184–185 are interconnected by an adjustment screw 186 which is rotatably mounted in the upper of the two tongues and is threaded into the lower of the two tongues. Tightening of each of the adjustment screws 186 causes the corresponding lower tongue 185 to flex and thereby change the inclination of the corresponding transducer head.

Suitable damping means may be mounted under the four transducer heads. In the construction shown, a metal spacer block 188 is mounted on the surface of the base block 65 and a layer 190 of elastomeric material is interposed under appropriate compression between the spacer block and the ends of the transducer heads. The layer 190 is made of relatively "dead" elastomer, i.e., an elastomer of relatively low resilience for relatively high damping effectiveness.

*Résumé of the structural provisions for minimizing disturbances of the tape and departures from constant speed*

The problem of providing a servomechanism of the required sensitivity, i.e., with a bandwidth extending to 4000 c.p.s. for quick response with low dynamic lag is solved primarily by employing a motor having a high ratio of torque to inertia in conjunction with a low inertia rotary drive assembly. The precision-built printed circuit motor has the required high ratio of torque to inertia. The rotary drive assembly has low inertia because the two disks 74 and 75 are thin light-weight plastic disks, the drive shaft 72 is of relatively small diameter and is made of light-weight titanium, and the hub structure 76 and the associated cap 80 are made of light-weight aluminum. The thin armature disk 74 occupies little of the axial dimension of the shaft and therefore does not add to the length of the shaft. Placing the tachometer disk 75 on one end of the shaft and the capstan on the other end keeps these two driven parts as close to the drive motor as possible. Placing the ring magnet 105 on the capstan side instead of on the tachometer side permits exceptionally close coupling between the motor and the tachometer disk.

All the structure is mounted on the single massive metal base block 65 to minimize relative vibration among the parts and all of the normally stationary support members are exceedingly stiff to place their resonance frequencies well above the 4000 c.p.s. peak of the servomechanism. Thus the support structures for the two nip rollers 24 and 25 are relatively stiff, especially the yokes 33; the bracket 130 for bracing the upper end of the capstan is a thick block of metal; the tape guide 156 for guiding the tape and supporting the idler roller 26 is a massive metal block of large cross section; and the bracket 170 for the transducer heads 20 is also a massive metal block of large cross section. It is to be noted, moreover, that both ends of the idler roller are rigidly supported.

The resonance of the rotary parts is kept well above 4000 c.p.s. by using parts that have both a high spring rate, i.e., stiffness, and low inertia, i.e., low weight. Thus the rotary drive assembly not only has low inertia as heretofore pointed out but also is composed of stiff components. The titanium drive shaft 72 being both stiff and light in weight also has a high ratio of spring rate to inertia and the hub structure 76 provides a stiff close coupling between the drive motor and the tachometer disk. The portion of the drive shaft 72 that extends above the plastic armature disk 74 of the drive motor is necessarily relatively long but high resonance frequency is favored by rigidly supporting the shaft at spaced points by the two pairs of roller bearings 68 and 70; and the third roller bearing 135.

The burden on the servomechanism of compensating for disturbances is minimized by the various damping means. Since the lower part of the drive shaft 72 is rigidly axially confined by the two spaced pairs of ball bearings 68 and 70, the upper end of the drive shaft tends to act as a vibration-responsive cantilever beam, but this tendency is counteracted by the damping O-rings 136 embracing the upper ball bearing 135. Any residual disturbances in the rotary drive assembly that are transmitted to the capstan 22 are reduced by the internal damping of the capstan. Flutter and other disturbances originating in the tape itself and transmitted by the tape to the idler roller 26 as well as disturbances created by the bearings of the idler roller are modified by the internal damping of the idler roller. In addition, disturbances created by frictional contact of the traveling tape with the four transducer heads 20 are damped out by the appropriately compressed elastomeric layer 190 in abutment with the transducer heads.

The primary object of the tape-transport mechanism is, of course, to achieve the desired constant speed of tape travel in the region of the transducing station along the outgoing leg of the tensioned tape loop. Flutter and other disturbances originating in the adjacent ingoing leg of the tensioned loop of the tape are minimized by the tape guide 156 and are isolated from the transducing station by the internally damped idler roller 26. Disturbances arising from the compliance of the tape in the outgoing leg of the tensioned loop are minimized by the fact that the transducer heads, in effect, divide the outgoing leg into a series of short length of the tensioned tape. These disturbances are further reduced by the damping of the transducer heads. Thus the transducing station is a "dead" zone of the traveling tape.

*Alternate mounting for the transducer heads*

FIGS. 12–14 show an alternate structure for mounting the transducer heads which may be substituted for the previously described structure shown in FIGS. 10 and 11.

The alternate structure includes a bracket generally designated 200 to be substituted for the previously mentioned bracket 170. The bracket 200 has a base flange 202 which rests on the base block 65 and has a second opposite flange 204 which overhangs the four transducer heads 20. The base flange 202 is provided with the usual parallel slots (not shown) to receive screws for adjustably anchoring the bracket to the base block 65.

The four transducer heads include two recording heads 20a and two reproducing heads 20b and it is contemplated that the two reproducing heads 20b will be mounted on the bracket 200 in such manner that the reproducing heads may be adjustably inclined in the plane of the adjacent traveling tape.

In the construction shown in the drawings, two metal plates 205 are fixedly mounted on the underside of the overhanging flange 204 of the bracket 200, each of the two plates being fixedly anchored by four screws 206. As indicated in FIG. 14 an end portion 205a of each of the two metal plates 205 is reduced in thickness and is formed with a transverse slot 208 whereby the end portion may function as a tongue which may be flexed by virtue of the slot. As shown in FIG. 14 a layer 210 of elastomeric material is interposed between each tongue 205a and the overhanging flange 204 of the mounting bracket 200. A suitable adjustment screw 212 extends through the elastomeric layer 210 into threaded engagement with the tongue 205a for flexural adjustment of the tongue.

In the construction shown the shank of the screw 212 has a first portion 214 of relatively large diameter and relatively coarse pitch and a second portion 215 of smaller diameter and finer pitch. The first portion 214 of the screw shank threads into a bushing 216 in a bore 218 in the overhanging bracket flange 204. The bushing may be formed with a circumferential groove 220 for releasable anchorage by a transverse set screw 222 (FIG. 13). The second portion 215 of the screw shank threads into a threaded bore 224 in the tongue 205a.

It is apparent that the adjustment screw 212 functions with a differential thread action since rotation of the screw causes the screw to move axially in the bushing 216 at one rate and causes the second portion 215 of the screw to move axially in the bore 224 at a lesser rate. Turning the screw 212 clockwise causes the screw to advance relative to the bushing 216 and causes the second portion 215 to flex the tongue 205a downward at a lesser rate. Thus the adjustment screw 212 functions, in effect, as a fine pitched screw for fine adjustment of the flexure of the tongue 205a.

Each of the two recording transducer heads 20a is fixedly mounted on the underside of the fixed body portion of the corresponding metal plate 205 by a corresponding screw 225 and each of the alternate reproducing heads 20b is suitably mounted on the corresponding adjustable flexible tongue 205a to be adjusted in inclination by the corresponding adjustment screw 212.

Each of the two reproducing heads 20b may be secured by a screw 226 in the manner shown in FIG. 14. The overhanging bracket flange 204 has a bore 227 to clear the socket head of each of the screws 226, the socket head abutting the upper side of the corresponding tongue 205a. The screw 226 extends through a bore 228 in the tongue 205a and the screw is formed with a long neck 230 which is of substantially smaller diameter than the diameter of the bore 228 to permit divergence of the screw relative to the angle of the bore. The lower end of the screw 226 has an enlarged threaded portion 232 which screws into a corresponding threaded bore 234 in the corresponding reproducing transducer head 20b. It is appaent that the screw 226 clamps the transducer head 20b against the undersurface of the flexible tongue 205a regardless of the degree of flexure of the tongue and thus causes the transducer head to be inclined in accord with the flexure of the tongue. The transducer heads are connected to insulated wires 235 which lead to a plug fitting 236.

In the previously described manner, a metal spacer block 188 is mounted on the surface of the base block 65 and a layer 190 of elastomeric material is interposed under appropriate compression between the spacer block and the lower ends of the transducer heads. Thus the lower ends of all of the transducer heads are in damping contact with the lower layer 190 of elastomeric material and the upper ends of the two reproducing heads 20b are in damping relation with the corresponding upper layers 210 of elastomeric material.

Our description in specific detail of the presently preferred embodiment of the invention will suggest various changes, substitutions and other departures from our disclosure within the spirit and scope of the appended claims.

We claim:
1. In a capstan assembly for transporting tape with precision for obtaining an accurate reproduction from a movable medium of information previously recorded on the medium where the capstan assembly operates in conjunction with a servo system having a bandwidth in excess of 100 cycles per second, the combination of:

a motor having a stator and a rotor;
a drive shaft carrying said rotor;

a capstan on said drive shaft;

bearing means journalling said shaft between the capstan and the rotor;

additional bearing means journalling said shaft on the far side of the capstan;

means including elastomeric means yieldingly supporting said additional bearing means to dampen disturbances in the adjacent portion of the shaft;

roller means cooperative with the capstan to engage and drive the tape;

an idler roller cooperative with the capstan to form the driven tape into a tensioned loop having two legs;

damping means incorporated in both said capstan and said idler roller internally thereof;

transducer means for contact with the traveling tape at one leg of said loop; and a tachometer driven by the motor.

2. A combination as set forth in claim 1 in which said servomechanism has a given bandwidth and all of the moving parts of the combination have resonance frequencies above said bandwidth.

3. In a capstan assembly for transporting tape with precision for obtaining an accurate reproduction from a movable medium of information previously recorded on the medium where the capstan assembly operates in conjunction with a servo system having a bandwidth in excess of 100 cycles per second, the combination of:

a power-actuated drive capstan;

an idler roller cooperative with the capstan to form the tape into a loop having two legs;

nip rollers cooperative with the capstan to drive the tape differentially to place the tape loop under tension;

damping means incorporated in both the capstan and the idler roller internally thereof;

guide means confining one leg of the loop to minimize disturbances therein; and transducer means adjacent the other leg of the loop for contact with the traveling tape; and damping means in pressure communication with said transducer means.

4. A combination as set forth in claim 3 which includes bearing means for said capstan; and includes damping means in pressure communication with said bearing means.

5. In a capstan assembly for obtaining a reproduction from a movable medium of signals previously recorded on the medium where the operation of the capstan assembly is controlled by a servomechanism having a bandwidth in excess of 100 cycles per second, the combination of:

a driving mechanism disposed in contiguous relationship to the movable medium to engage and drive the movable medium upon a driving of the driving mechanism, the driving mechanism provided with a light and rigid construction;

a motor having a low inertia and directly coupled to the driving mechanism to drive the driving mechanism;

rotary means coupled to the driving mechanism and to the movable medium and driven by the driving mechanism to obtain the movement of the movable medium in cooperation with the driving mechanism; and support means coupled to the driving mechanism to prevent on a mechanical basis any mechanical resonances of the capstan assembly within a frequency range comprising at least the bandwidth of the servo.

6. A combination as set forth in claim 5 wherein the last mentioned means are constructed to prevent on a mechanical basis any mechanical resonances with a frequency band of at least several hundred cycles and wherein the last mentioned means include an overarm support at one end of the driving mechanism.

7. The combination set forth in claim 5 in which the motor of low inertia is a printed circuit motor.

8. In a capstan assembly for obtaining an accurate reproduction from a movable medium of information previously recorded on the medium where the capstan assembly operates in conjunction with a servo system having a bandwidth in excess of 100 cycles per second, the combination of:

a drive motor having a stator and a rotor of a low inertia;

a rotary assembly including said rotor, a capstan of a light and rigid material and a tachometer of a low inertia, the rotor, the capstan and the tachometer being directly coupled to one another on a common axis and in displaced relationship to one another;

a transducer station disposed relative to the movable medium to provide a transducing action on the signals recorded on the medium;

means cooperative with said capstan to drive the movable medium past the transducer station for a transducing action by the transducing station; and means including the rotary assembly for preventing mechanical resonances of said rotary assembly at frequencies within the bandwidth of the servo.

9. In the capstan assembly set forth in claim 8, the tachometer being an optical tachometer of small thickness.

10. The combination set forth in claim 8 in which the drive motor is a printed circuit motor and the rotor is a printed circuit rotor.

11. In a capstan assembly for obtaining an accurate reproduction from a movable medium of information previously recorded on the medium where the capstan assembly operates in conjunction with a servo system having a bandwidth in excess of 100 cycles per second, the combination of:

a motor having a stator and a rotor of a light inertia and of thin dimensions;

a drive shaft carrying said rotor and constructed of a light and rigid material;

a capstan on said drive shaft in displaced relationship to the rotor and constructed of a light and rigid material;

roller means cooperative with the capstan to drive the movable medium;

means disposed at one end of the shaft for holding the shaft in fixed position against any pivotal movement;

means disposed at the other end of the shaft for holding the shaft in fixed position against any pivotal movements to provide for mechanical resonances of the shaft only at frequencies above the passband of the servo; and a thin tachometer disc of a light inertia and mounted on the shaft in relatively close relationship to the rotor and in displaced relationship to the capstan.

12. The combination set forth in claim 11 in which the motor is a printed circuit motor and the rotor is a printed circuit rotor.

13. In a capstan assembly for obtaining an accurate reproduction from a movable medium of information previously recorded on the medium where the capstan assembly operates in conjunction with a servo system having a bandwidth in excess of 100 cycles per second, the combination of:

a rigid base;

a motor having a stator and a rotor with a light inertia;

a drive shaft carrying said rotor and journalled in said base with one end of the shaft extending beyond the base;

bearing means journalling the outer end of the drive shaft;

a capstan on the shaft between the base and the bearing means;

nip rollers cooperating with the capstan to engage and drive the tape;

an idler roller cooperative with the capstan to form the driven tape into a tensioned loop having two legs;

damping means incorporated in said capstan internally thereof for providing a resonance of said capstan at a frequency above the bandwidth of the servo;

damping means incorporated in said idler roller internally thereof for facilitating the production of a resonance of said idler roller at a frequency above the bandwidth of the servo; and rigid support structure mounted on said base and supporting said bearing means, said nip rollers and said idler roller.

14. The combination set forth in claim 13 in which the motor is a printed circuit motor and the rotor is a printed circuit rotor.

15. In a capstan assembly for obtaining an accurate reproduction from a movable medium of information previously recorded on the medium where the capstan assembly operates in conjunction with a servo system having a bandwidth in excess of 100 cycles per second, the combination of:

a motor having a stator and a thin rotor of a low inertia and constructed to produce a rotation of the rotor upon an energizing of the motor;

a drive shaft directly carrying said rotor and constructed to be driven by the rotor upon a rotation of the rotor;

a capstan on the shaft;

roller means disposed in cooperative relationship with the capstan to provide a movement of the movable medium;

a thin tachometer disk having a low inertia and directly mounted on the drive shaft in spaced relationship to the rotor;

means operatively coupled to the drive shaft at one end of the shaft for supporting the shaft; and mechanical means operatively coupled to the drive shaft at the other end of the drive shaft for inhibiting the production of mechanical resonances of the capstan assembly at frequencies within the passband of the servo.

16. A combination as set forth in claim 15 wherein the mechanical means includes bearing means journalling said shaft at the other end of the shaft.

17. A combination as set forth in claim 15 wherein transducer means are constructed to produce signals and are disposed in contiguous relationship to the movable medium to provide a transducing action between the signals recorded on the medium and the production of the signals by the transducing means and wherein the drive shaft and the capstan are constructed of a light material to minimize the inertia of the capstan assembly.

18. The combination set forth in claim 15 in which the rotor of low inertia is a printed circuit rotor.

19. The combination set forth in claim 15 in which the rotor of low inertia is a printed circuit disc.

20. In a capstan assembly for obtaining an accurate reproduction from a movable medium of information previously recorded on the medium where the capstan assembly operates in conjunction with a servo system having a bandwidth in excess of 100 cycles per second, the combination of:

a rigid base structure;

a drive shaft supported by said base structure and having first and second opposite ends;

a motor having a stator and a thin disk rotor of a light inertia, said rotor being mounted on the first end of the shaft;

a thin tachometer disk mounted on the first end of the shaft;

a capstan mounted on the second end of the shaft;

mechanical means mounted on the drive shaft at the second end of the shaft at a position beyond the capstan for facilitating an avoidance of mechanical resonances at frequencies within the passband of the servo;

means disposed in cooperative relationship with the capstan to obtain a movement of the movable medium; and transducer means constructed to produce signals and disposed in contiguous relationship with the movable medium to provide a transducing action between the signals recorded on the medium and the production of the signals by the transducing means.

21. In a capstan assembly for obtaining an accurate reproduction from a movable medium of information previously recorded on the medium where the capstan assembly operates in conjunction with a servo system having a bandwidth in excess of 100 cycles per second, the combination of:

a drive shaft constructed of a light material and provided with a particular axis;

a motor having a stator and magnetic means forming a part of the stator, the motor also having a rotor in the form of a thin disk of a low inertia, said rotor disk being mounted on said shaft and said stator fixedly enveloping the shaft and the magnetic means in the stator disposed on opposite sides of the rotor disk, the motor being operative to produce a rotation of the rotor disk when energized;

a thin tachometer disk mounted on the shaft in displaced relationship to the rotor disk and formed from a material of a low inertia;

a capstan on said drive shaft in displaced relationship to the rotor disk and the tachometer disk;

means cooperative with the capstan to obtain a movement of the movable medium in accordance with the rotation of the drive shaft by the rotor disk; and means for obtaining a controlled avoidance of mechanical resonances in the capstan assembly at frequencies within the passband of the servo.

22. A combination as set forth in claim 21 wherein the last mentioned means include an overarm support at one end of the shaft for increasing the resonant frequency of the shaft as a result of cantilever effect to a frequency above the passband of the servo.

23. In a capstan assembly for obtaining a reproduction from a movable medium of signals previously recorded on a medium where the operation of the capstan assembly is controlled by a servomechanism having a bandwidth of at least 100 cycles per second, the combination of:

a driving mechanism disposed to engage and drive the movable medium, said driving mechanism including a motor of low inertia and rotary means driven by the motor to obtain the movement of the movable medium, all of the components of the driving mechanism having a relatively high ratio of spring rate to inertia to place the resonant frequency of these components above the bandwidth of the servo; and a transducer disposed relative to the movable medium to provide a transducing action on the signals recorded on the medium.

24. The combination set forth in claim 23 in which the motor of low inertia is a printed circuit motor.

References Cited

UNITED STATES PATENTS

| | | | |
|---|---|---|---|
| 2,111,806 | 3/1938 | Ross | 242—75 |
| 2,854,526 | 9/1958 | Morgan. | |
| 2,880,280 | 3/1959 | Gernert et al. | |
| 2,909,337 | 10/1959 | Lahti | 242—55.12 |
| 2,913,192 | 11/1959 | Mullin | 226—186 X |

(Other references on following page)

UNITED STATES PATENTS

| | | | |
|---|---|---|---|
| 2,977,480 | 3/1961 | Keene | 250—219 X |
| 2,997,547 | 8/1961 | Beachell. | |
| 3,060,277 | 10/1962 | Baker et al. | |
| 3,093,284 | 6/1963 | Mullin | 226—176 |
| 3,100,071 | 8/1963 | Neff | 226—176 |
| 3,123,271 | 3/1964 | Johnson | 226—186 |
| 3,136,467 | 6/1964 | Olson | 226—188 X |
| 3,140,029 | 7/1964 | Groenewegen | 226—196 X |
| 3,141,625 | 7/1964 | Namenyi-Katz. | |
| 3,147,901 | 9/1964 | Nordman | 226—186 X |
| 3,172,028 | 3/1965 | Dechet | 310—268 X |
| 3,179,752 | 4/1965 | Brenner. | |
| 3,185,364 | 5/1965 | Kleist | 226—24 |
| 3,187,315 | 6/1965 | Cheney. | |

FOREIGN PATENTS 874,668 8/1961 Great Britain.

M. HENSON WOOD, JR., *Primary Examiner.*

ANDRES H. NIELSEN, BERNARD KONICK, IRVING L. SRAGOW, *Examiners.*

A. T. McKEON, R. A. SCHACHER, *Assistant Examiners.*